W. S. HARLEY.
SIDE CAR FOR MOTOR CYCLES.
APPLICATION FILED OCT. 15, 1917.
1,262,785.
Patented Apr. 16, 1918.
3 SHEETS—SHEET 3.
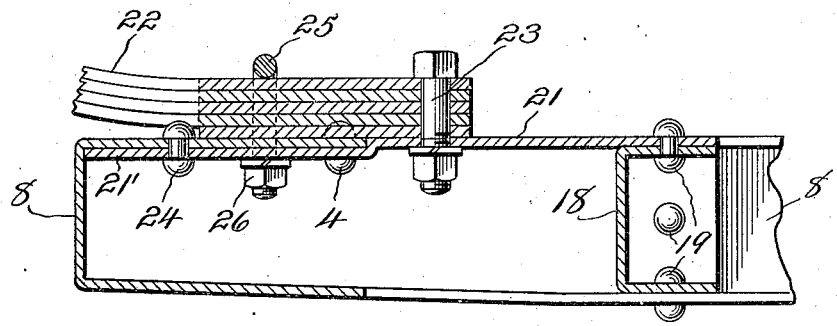
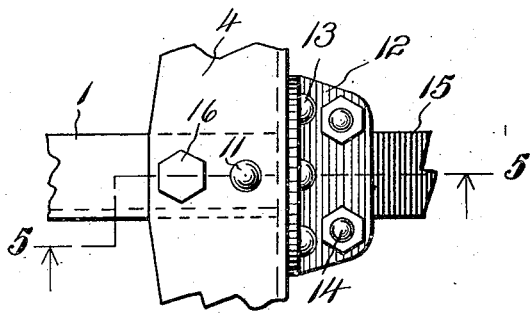
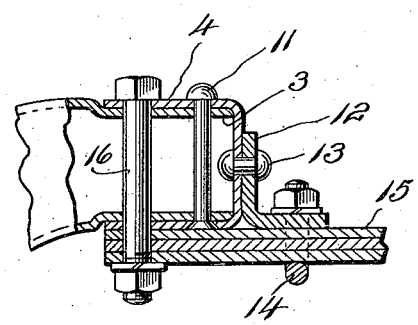

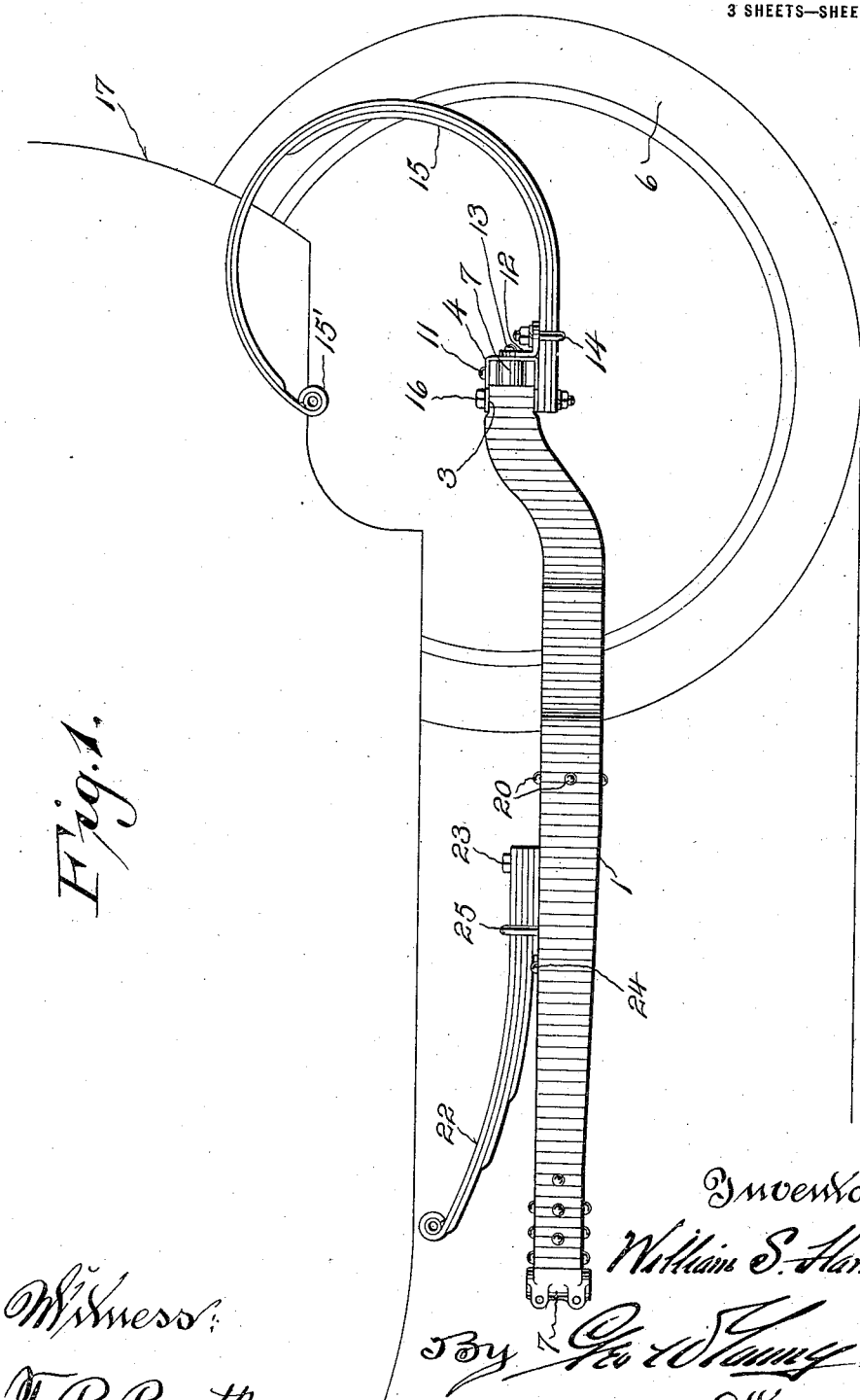

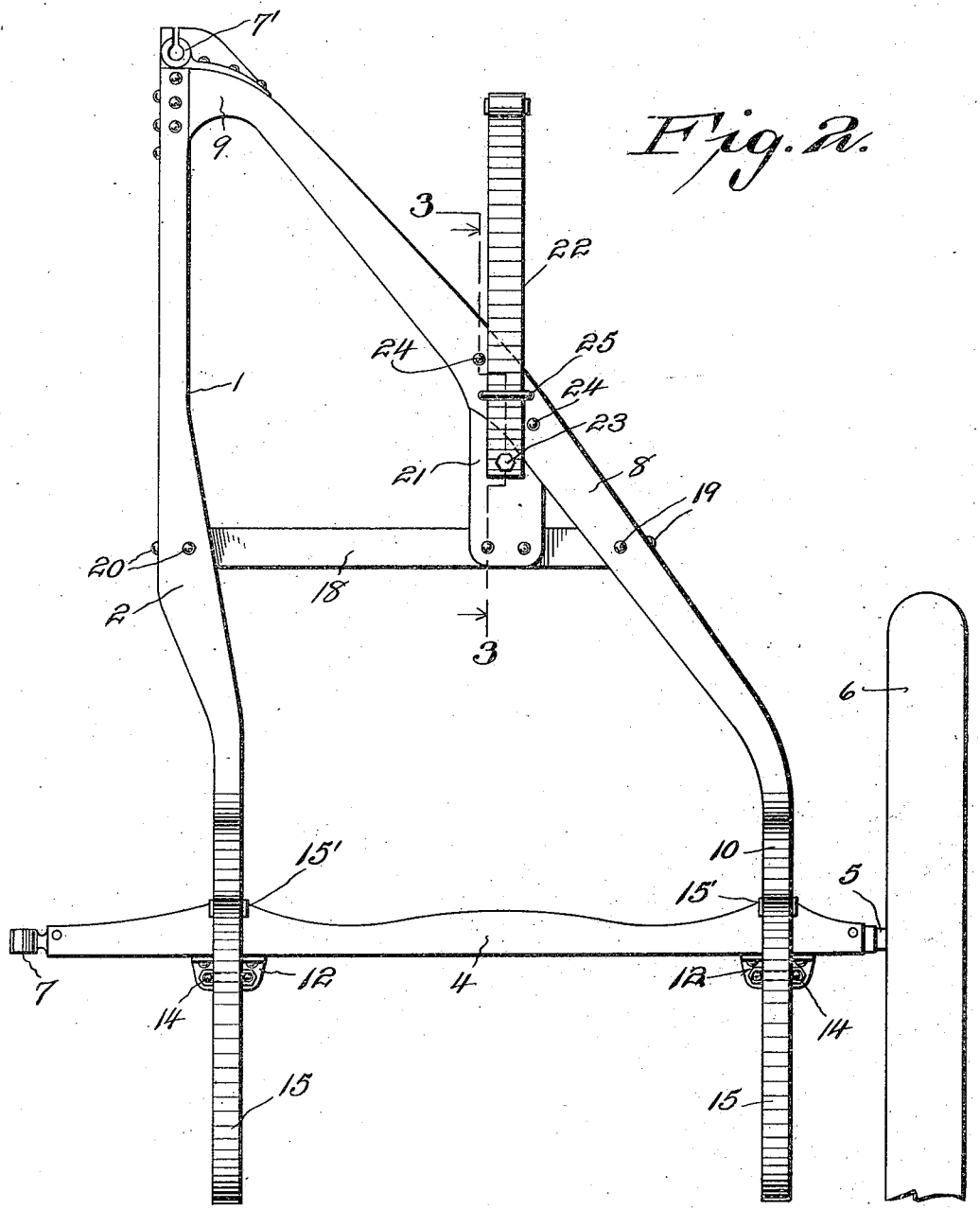

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

SIDE CAR FOR MOTOR-CYCLES.

1,262,785.  Specification of Letters Patent.  Patented Apr. 16, 1918.

Application filed October 15, 1917. Serial No. 196,631.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Side Cars for Motor-Cycles; and I do hereby declare that the following is a full, clear, and exact description thereof.

The present invention relates to certain new and useful improvements in motorcycles, and more particularly to a side car therefor of that type exemplified in Letters Patent No. 1,212,350, granted to me January 16, 1917.

The primary object of the invention is to provide a three point spring connection between the supporting frame and the car body in place of the four point spring suspension utilized in the device depicted in the Letters Patent hereinbefore mentioned.

A further object of this invention is to provide a supporting frame for a motorcycle side car which is substantially triangular in shape and formed of channeled iron or steel whereby a more durable and less expensive frame is produced.

With the above and other objects in view which will appear as the description proceeds my invention resides in the novel construction, combination and arrangement of parts substantailly as hereinafter described, and more particularly defined by the appended claims, it being understood that such changes in the precise embodiment of the herein disclosed invention may be made as come within the scope of the claims.

In the accompanying drawings I have illustrated one complete example of the physical embodiment of my invention constructed according to the best mode I have so far devised for the practical application of the principles thereof, and in which:

Figure 1 is a side elevational view of the lower portion of a motorcycle side car, the pertinent features of my invention being shown in heavy shaded lines.

Fig. 2 is a top plan view of the supporting frame and the side car body supporting springs carried thereby.

Fig. 3 is a view part in section and part in elevation and taken on the plane indicated by line 3—3 of Fig. 2.

Fig. 4 is a top plan view of that portion of the frame where the inner side bar connects with the axle or casing, and Fig. 5 is a sectional view taken longitudinally through Fig. 4 on the line 5—5.

Referring now more particularly to the accompanying drawings by numerals, it will be seen that my improved side car structure comprises in its general organization an inner side bar 1 having its intermediate portion enlarged and inwardly and rearwardly inclined as at 2 and its rear portion directed laterally on a plane parallel with the forward end thereof and its extreme rear end reduced as at 3 to engage the channel of a rear axle or casing 4 that has secured in its outer end an axle 5 for a suitable sustaining wheel 6 and in its inner end a suitable clamp or other means 7 for engaging a portion of a motorcycle frame (not shown). An outer diagonally extending brace bar 8 is provided having its forward end 9 curved laterally for securement to the forward end of the inner side bar 1 and its rear end directed laterally on a plane substantially parallel to the rear portion of inner side bar 1.

The rear end 10 of the brace bar 8 is also reduced similar to the rear end of the inner side bar 1 for securement in the channel of the axle 4 and as the manner of securing the rear ends of the bars 1 and 8 in the channel of the axle 4 is substantially the same, the description of one will suffice for both. The reduced end 3 as best shown in Figs. 4 and 5, is secured in axle 4 by means of a rivet or other suitable fastening 11 which passes through axle 4 and end 3 as depicted in Fig. 5.

Secured to the rear wall of the channeled axle 4 adjacent the ends of bars 1 and 8 are a pair of angle plates 12 having their vertical portions secured to the axle 4 by suitable fastenings 13 and having openings in their horizontal portions for the reception of the ends of suitable U-bolts 14. At the end of each bar 1 and 8 is secured a suitable suspension spring 15 which has its inner end secured to the plate 12 by means of the U-bolt 14 and to the axle 4 by means of a binding bolt 16 which passes through the axle 4, end 3 and spring 15 as best shown in Fig. 5.

As will be readily seen by reference to Figs. 2 and 4, the springs 15 form extensions from bars 1 and 8 and are curved upwardly and then forwardly and have their ends 15' secured to the sides of a side car body 17 as depicted in Fig. 1.

Intermediately connecting the bars 1 and 8 is a transverse brace 18, which has its outer end secured in the channel of bar 8 by means of suitable fastenings 19 and its inner end secured in the channel of the inner bar 1 at its enlarged portion 2 by means of suitable fastenings 20, and secured to the bar 8 and brace 18 is a longitudinally extending plate 21 to which the inner end of a single forward body supporting spring 22 is secured by means of a suitable binding bolt or other means 23. As best shown in Fig. 3 the plate 21 has its forward end 21' secured to the under face of the bar 8 by means of suitable fastenings 24 and has its portion extending rearwardly from the bar 8 on an even plane with the top surface of bar 8 whereby the inner end of spring 22 will be properly supported therefrom.

The spring 22 also has its inner portion secured to bar 8 by means of a U-bolt 25 which passes through the top plate of bar 8 and the inner end 21' of plate 21 and secured thereto by suitable binding nuts 26 and has its forward end curved upwardly and secured centrally to the side car body 17.

As clearly shown in Fig. 2 the forward spring 22 is positioned midway the rear springs 15 and equidistant from each of the same.

By this manner of providing a three point spring support for the body 17, an easier riding car is provided and also a less expensive structure is produced which is an important element in the view of the present day cost of material. Also the method of constructing the frame of channeled iron provides a stronger as well as a less expensive structure, and the frame is secured to the motorcycle frame (not shown) by means of the clamp 7 and a suitable clamp 7' secured to the forward meeting ends of bars 1 and 8 as will be obvious.

I claim:

1. In a device of the class described, the combination with a supporting frame including an inner side bar, a diagonally extending brace bar having its forward end secured to the forward end of said inner bar, a transverse brace bar intermediately connecting said inner side bar and diagonally extending brace bar, and an axle connecting the rear ends of said inner side bar and diagonally extending bar, of a plate secured to said transverse brace bar and said diagonally extending brace bar, a spring secured to said plate and extending forwardly of the frame, a pair of springs secured to the axle and extending rearwardly of the ends of said inner side bar and diagonally extending brace bar, and a body supported by said springs.

2. In a device of the class described, the combination with a channeled rear axle, of a frame bar having its rear end reduced and secured in the channel of said axle, an angular plate secured to the rear wall of said axle adjacent the end of said frame bar, a spring extending rearwardly of said frame bar, means engaging said angular plate and spring, and means passing through said axle, frame bar and spring to secure the same in place.

3. In a device of the class described, a supporting frame, a pair of spaced body supporting springs secured to the frame at one end, an additional spring secured to the frame adjacent its other end, said additional spring being disposed midway of the pair of springs and equidistant from each, and a body disposed on said springs.

4. In a device of the class described, a frame including a rear axle, a frame bar having its rear end secured to said axle, an angle plate having one flange secured to the side of said axle, a body supporting spring, means for securing one end of said spring to said axle, and means for attaching the intermediate portion of said spring to the other flange of said angle plate.

5. A frame for cycle side cars comprising a longitudinally extending relatively straight side bar, a brace bar having one end portion disposed substantially parallel to said side bar, the other end portion being extended diagonally of the side bar and secured to the end thereof, an axle connecting the substantially parallel end portions of the bars, and a transverse brace connecting the intermediate portions of the side bar and brace bar.

6. A frame for cycle side cars comprising a longitudinally extending relatively straight side bar, a brace bar having one end portion disposed substantially parallel to said side bar, the other end portion being extended diagonally of the side bar and secured to the end thereof, an axle connecting the substantially parallel end portions of the bars, a spring secured to the end of each substantially parallel portion of the bars, and an additional spring secured to the diagonally extending portion of the brace bar.

7. A frame for cycle side cars comprising a longitudinally extending relatively straight side bar, a brace bar having one end portion disposed substantially parallel to said side bar, the other end portion being extended diagonally of the side bar and secured to the end thereof, an axle connecting the substantially parallel end portions of the bars, a transverse brace connecting the intermediate portions of the side bar and brace bar, a spring attaching plate secured to said brace and the diagonally extending portion of the brace bar, a body supporting spring secured to the attaching plate, and body supporting means secured to the parallel portions of the side bar and brace bar.

In testimony that I claim the foregoing I have hereunto set my hand at Milwaukee, in the county of Milwaukee and State of Wisconsin.

WILLIAM S. HARLEY.

Copies of this patent may be obtained for five cents each, by addressing the "Commissioner of Patents, Washington, D. C."